No. 765,841. PATENTED JULY 26, 1904.
J. W. JONES.
SPEEDOMETER.
APPLICATION FILED MAR. 28, 1903.
NO MODEL.

Witnesses:

Joseph W. Jones, Inventor
by Mauro, Cameron Lewis, Att'ys.

No. 765,841.                                             Patented July 26, 1904.

UNITED STATES PATENT OFFICE.

JOSEPH W. JONES, OF NEW YORK, N. Y.

SPEEDOMETER.

SPECIFICATION forming part of Letters Patent No. 765,841, dated July 26, 1904.

Application filed March 28, 1903.  Serial No. 150,013.  (No model.)

*To all whom it may concern:*

Be it known that I, JOSEPH W. JONES, of New York city, State of New York, have invented a new and useful Speedometer, which is fully set forth in the following specification.

My speedometer is a device by which at a glance can be determined the speed at which an automobile or other vehicle is traveling.

The invention consists first in locating the dial and indicator upon the dashboard or any other portion of the vehicle within easy view of the attendant and connecting the mechanism with some revolving portion of the vehicle; and the invention consists, further, in the construction and arrangement of the parts to be hereinafter pointed out.

Figure 1:
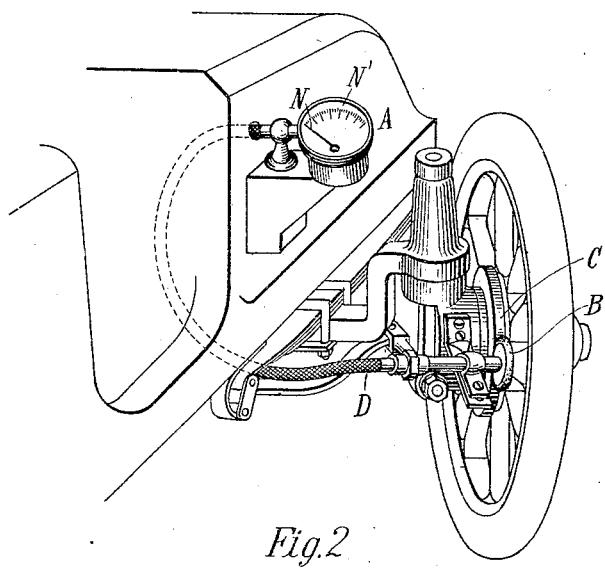
Figure 2:
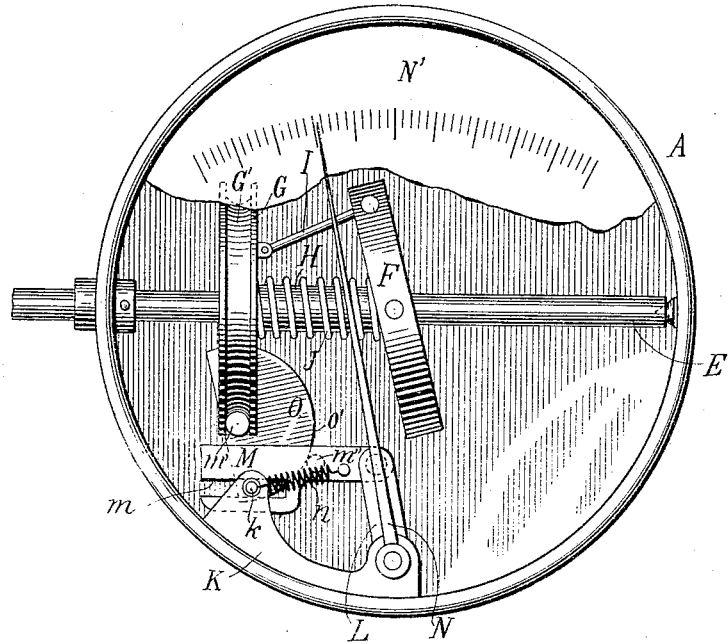

In the drawings, Figure 1 illustrates my speedometer applied to a vehicle; and Fig. 2 is a plan view, partly broken away, of the mechanism thereof.

A is the casing inclosing the mechanism.

B is a small friction-disk driven by a rotating part of the vehicle, as by an annular plate C, fast upon one of the wheels of the automobile, and D is a connection (flexible shaft or the like) communicating to the speedometer the revolutions given to friction-wheel B.

In the speedometer itself E is a revoluble shaft journaled diametrically of casing A, preferably having a cone-bearing at its inner end and likewise provided with ball-bearings. Upon this shaft E is pivoted transversely the fly-wheel F, so that it rotates with shaft E, but can swing around its pivot at varying angles to shaft E.

G is a light ring having a circumferential groove G' and secured rigidly (as by spokes or the like) to a sleeve H, which latter is keyed upon shaft E to slide longitudinally thereon while rotating therewith. A diagonal link I connects the periphery of wheel F with ring G. A spring J, resting against a fixed bearing on shaft E, (as the pivot of wheel F,) serves normally to hold the ring G away from the wheel F. The relative length of link I and the arrangement of the other parts are such that normally the wheel F lies at an acute angle to the shaft E.

Rapid rotation of shaft E, owing to the centrifugal force of the fly-wheel F, tends to bring the fly-wheel into a plane at right angles to its shaft E, as is obvious. Thereupon the link I, operating against the tension of spring J, draws the sleeve H and its ring G toward the fly-wheel F, (to the right in the figure.) When the shaft E and fly-wheel F are revolving very rapidly, the latter assumes more nearly the perpendicular to the former and the ring G is carried farther to the right. When the shaft E is revolving less rapidly, the fly-wheel F lies at a more acute angle to the shaft and the ring G is not carried so far to the right. In other words, the extent of the ring G's movement to the right is proportionate to the speed of the revolution of the shaft E.

K represents a bracket secured to the circular wall or casing A, and L is a link pivoted thereon, as shown. A sliding bar M is pivoted to the outer end of link L and is guided by a slot $m$, taking around a pin $k$ on bracket K. An indicator-hand N is made fast on link L, and its outer end swings over a dial-plate N'.

O is a cam pivoted as upon the same pin $k$ and having a stud $m'$ which projects within the circumferential groove G' of ring G. A cam-surface $o'$ on this cam O lies against a stud $m''$ on slide M, whereby the turning of cam O upon its pivot $k$ serves to push slide M to the right in the figure. Of course, longitudinal travel of the ring G causes the cam O to move on its pivot $k$, thereby shifting the indicator-hand N, as will be obvious. A small spring $n$ serves to hold pin $m''$ against the cam-surface $o'$.

In constructing these speedometers a slight difference in the size or relative arrangement of the parts or a very slight difference in the quality of the spring employed would make a considerable difference in the registering of the apparatus, thereby destroying its accuracy and reliability. To avoid these differences, I adjust each instrument as follows: The cam O is cast with its mass extending somewhat beyond the ultimate contour of what I have referred to as "cam-surface" $o'$. The parts are next assembled as shown, except that the pin $m''$ is omitted, and then by means of a shop device for producing a constant and known speed the shaft E is driven at a speed of, say, five miles an hour, while the pointer N is set to the five-mile mark on the dial. The straightening out of fly-wheel F draws ring G to the right, and ring G swings cam O to the right, and thereupon through the hole prepared for $m''$ with a sharp point I make a mark upon the corresponding portion of casting O. Shaft E is next revolved at a different speed—say ten miles an hour—while the pointer N is set at the ten-mile mark on the dial, and I again mark through the hole $m''$, producing a second marking upon the part of casting O then presented. This is continued for the different speeds. After the locations for the successive speeds have been thus plotted upon the side of the casting O the latter is removed and is dressed down according to these outline markings to produce the cam-surface $o'$ above referred to. By means of this procedure every apparatus is of the highest accuracy, not varying one-tenth of one per cent. in accurate registration of speeds.

The employment of the cam and the production of its cam-surface in the manner just described, whereby the utmost accuracy is obtained, constitute the very spirit of my invention; but in regard to the other features of the same many changes may be made without departing from my invention.

Having thus fully described my invention, I claim—

1. In a speedometer, a shaft adapted to be driven by the mechanism or vehicle the speed of which is being measured, a device movable longitudinally on said shaft, means for imparting movement to said device proportionately to the speed of the shaft, speed-indication means, and a cam actuated by said device the surface of which cam bears against a part of the indicating means to impart movement thereto.

2. In a speedometer, the combination with a revoluble shaft and a ring rotatable therewith, means moving the ring longitudinally on the shaft in accordance with the speed of rotation thereof, speed-indicating means comprising a dial and an indicator, and a pivoted cam actuated by said ring the surface of which cam bears against a part of the indicating means to impart movement thereto.

3. In a speedometer, a shaft adapted to be driven by the mechanism or vehicle the speed of which is being measured, a device movable longitudinally on said shaft, means for imparting movement to said device proportionately to the speed of the shaft, speed-indicating means, and a cam actuated by said device and consisting of a plate having a cam edge which bears against a part of the indicating means to impart movement thereto.

4. In a speedometer, a revoluble shaft carrying a ring rotatable therewith but caused to travel longitudinally thereof proportionately to the revolutions of said shaft, a dial and indicating device, a pivoted cam for shifting said device, and a pin upon said cam engaged by flanges upon said ring, whereby the longitudinal travel of said ring (caused by the revolutions of the said shaft) serves to shift said indicator proportionately.

5. In a speedometer, the combination of a revoluble shaft, a fly-wheel pivoted thereon but revolving therewith, a longitudinally-sliding ring connected to the outer periphery of said fly-wheel but normally held away therefrom by a spring, a spring holding said ring away from said fly-wheel, a dial and an indicator-hand, and a pivoted cam actuated by said ring to operate said indicator-hand.

In testimony whereof I have signed this specification in the presence of two subscribing witnesses.

JOSEPH W. JONES.

Witnesses:
C. A. L. MASSIE,
R. L. SCOTT.